United States Patent Office.

EDWIN D. BRAINARD, OF ALBANY, NEW YORK.

Letters Patent No. 92,934, dated July 27, 1869.

IMPROVED METHOD OF PRESERVING THE AROMATIC PRINCIPLE OF HOPS.

The Schedule referred to in these Letters Patent and making part of the same.

*To all whom it may concern:*

Be it known that I, EDWIN D. BRAINARD, of Albany, county of Albany, and State of New York, have invented a new and improved Method of Preserving the Aromatic Principle of Hops; and I hereby declare the following to be a full, clear, and exact description of the same.

This invention relates to a new method of preserving the aromatic flavor and odor of hops, (*Humulus lupulus*.)

The peculiar aromatic flavor and odor of fresh hops, are the properties which are essential in the manufacture of beer, and on which depends their commercial value. Hops which have been kept over one season, are generally quite worthless, on account of the loss of their odor and flavor.

These aromatic properties are extremely volatile under ordinary temperatures. They reside in a resinous, waxy substance, called "lupuline," which is found in the form of fine yellow grains or dust, covering the base of the scales of the catkin, and which constitutes about one-sixth of the weight of the hops when fresh.

This substance is changed in its nature by continued exposure of the hops to the air and to ordinary summer-heat, and loses its aromatic qualities by evaporation. For this reason, hops kept over from one season to another in the ordinary manner, become quite valueless. They are packed very closely in bags, and attempts have been made to preserve them by sealing them hermetically in metal casing, but the continued heat penetrates the mass, and vitiates the aromatic resinous substance, or dissipates its valuable properties under any circumstances.

Hops absorb moisture readily, and for this reason they cannot be kept in cellars or damp situations long without spoiling, even at a very low temperature, and they are usually stored in dry and airy lofts, as the best mode of preservation.

Now, I have discovered and ascertained, by experiment, that the conditions requisite for preserving the nature of the "lupuline" or resinous substance in hops unchanged, and retaining its valuable aromatic qualities, are dryness of the air and low temperature combined.

Both these conditions are essential for the preservation of hops. Previous to my discovery of this principle, it has not been known or applied, and the consequence is, great loss and inconvenience to the public.

The hop-crop is very precarious, and only one good crop is made generally in several successive seasons, causing scarcity in one year and a glut in another. And as hops cannot be stored in the usual way by either the grower, the merchant, or the brewer, without losing their essentially valuable qualities, the market-price varies extremely in different seasons, as well as at different periods of the year. In any case, the grower suffers, as he must sell soon after gathering the crop. He cannot keep it over the winter-season.

By my discovery or invention of a new mode of preserving the aromatic principle in hops, the loss and inconvenience to which the public has been heretofore subjected, will be obviated, and hops can be kept sound and merchantable for several years.

In order to carry out my invention or discovery, I take the hops, packed in bags in the usual way, or in any other suitable manner, and put them into a chamber or store-room, so connected with an ice-house or refrigerating-chamber as to have the air surrounding the hops reduced to a low temperature, or nearly to freezing-point, say between 40° and 50° Fahrenheit.

This store-room or chamber in which the hops are placed, must be made tight and close, without ventilation or communication with the external atmosphere, and must be provided with apparatus for condensing the moisture and abstracting it from the internal air, which is thus rendered perfectly dry, as well as cold, in the manner fully described in my patent for a "new and improved mode of dying and purifying the air," No. 66,786, dated July 16, 1867, and my patent for an "improved condensing and refrigerating-apparatus," No. 73,292, dated January 14, 1868.

The hops having been thus stored in a close chamber, and kept in a cold and dry atmosphere, the resinous substance lupuline undergoes no material change in its nature, and the odor and flavor of the hops are not dissipated and lost by evaporation.

By this management of hops, their aromatic principle can be preserved fully from one season to another, and they may be kept for several years without great loss of their essential qualities.

Having described the nature of my invention, and the means of performing the same,

What I claim, and desire to secure by Letters Patent, is—

The improved mode of preserving the aromatic principle of hops, as herein described.

EDWIN D. BRAINARD.

Witnesses:
A. V. DE WITT,
JAMES B. SANDERS.